Jan. 27, 1942. K. NISKANEN 2,271,154
WASHER AND BOLT ASSEMBLY MACHINE
Filed Dec. 13, 1937 5 Sheets-Sheet 1
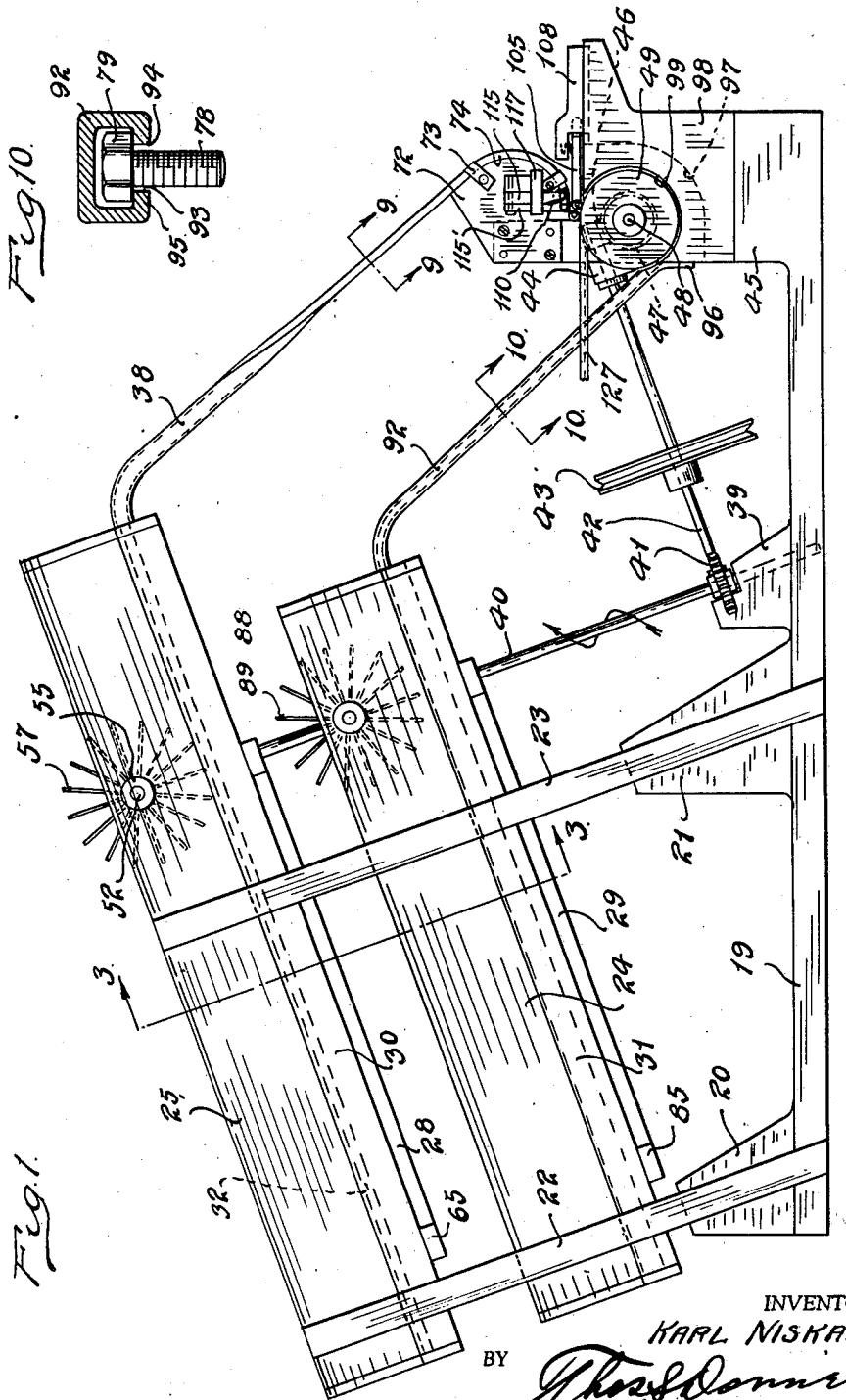
INVENTOR.
KARL NISKANEN.
BY
ATTORNEY.

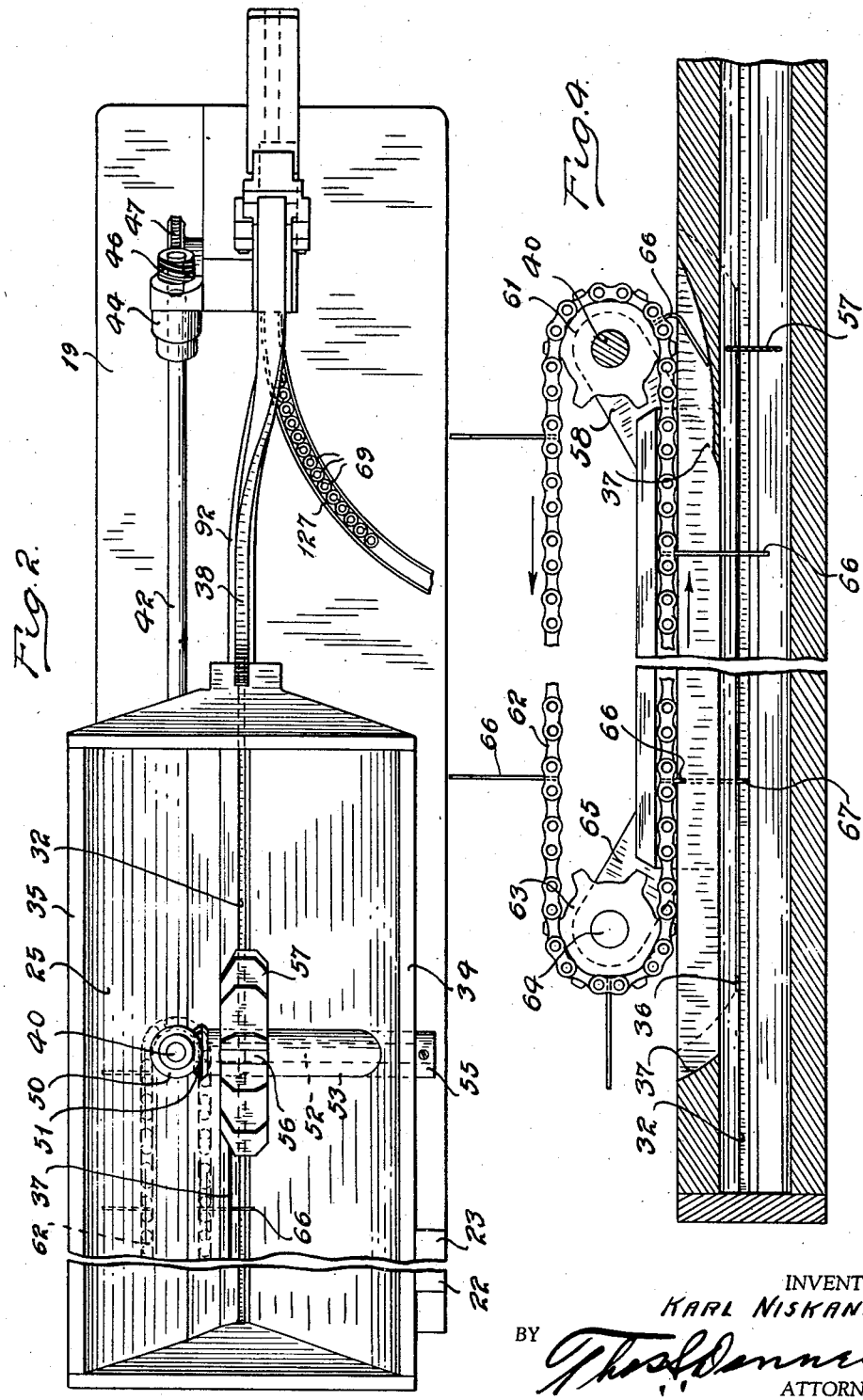

Jan. 27, 1942.  K. NISKANEN  2,271,154
WASHER AND BOLT ASSEMBLY MACHINE
Filed Dec. 13, 1937   5 Sheets-Sheet 3
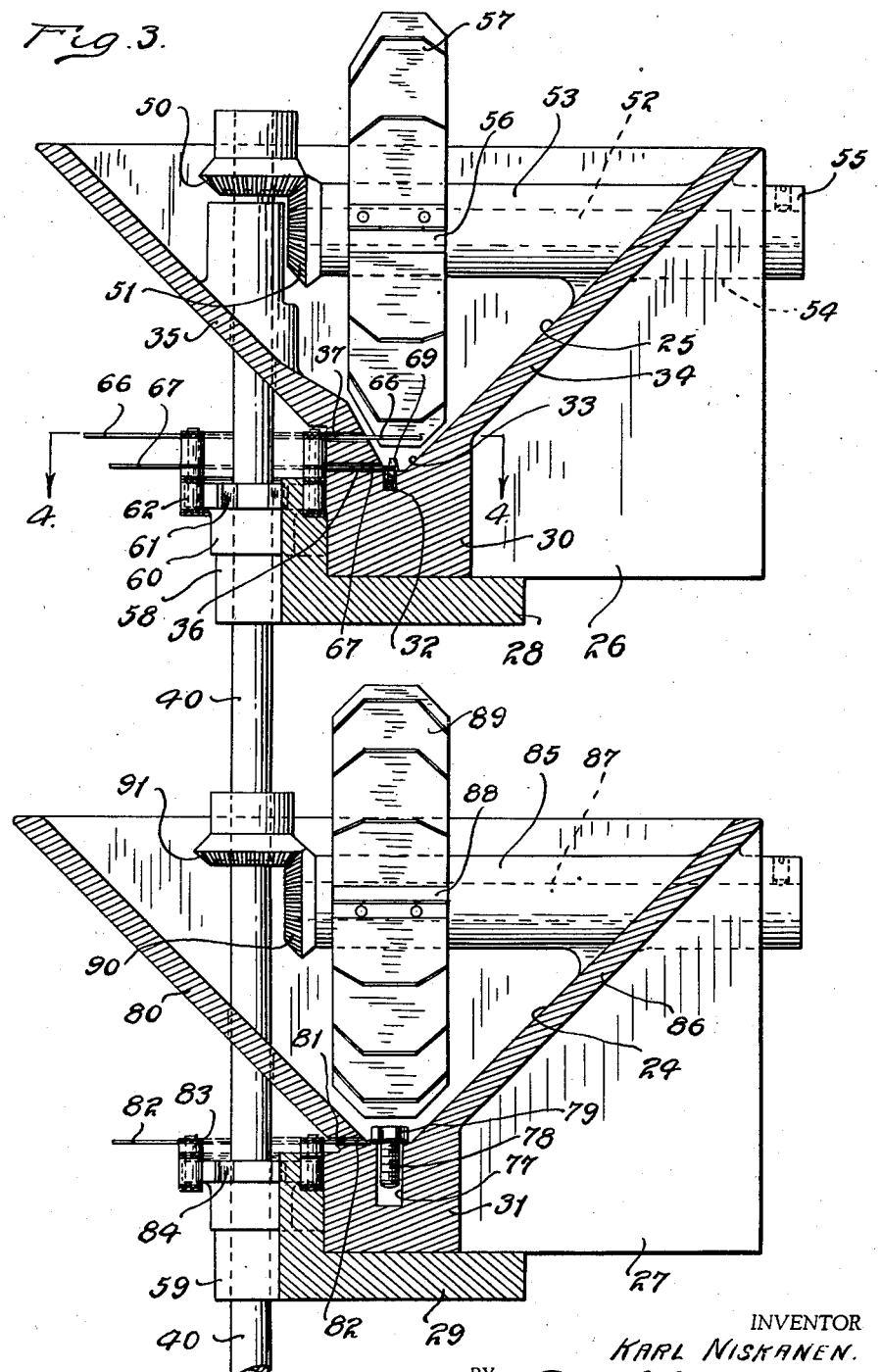
INVENTOR
KARL NISKANEN.
BY
ATTORNEY.

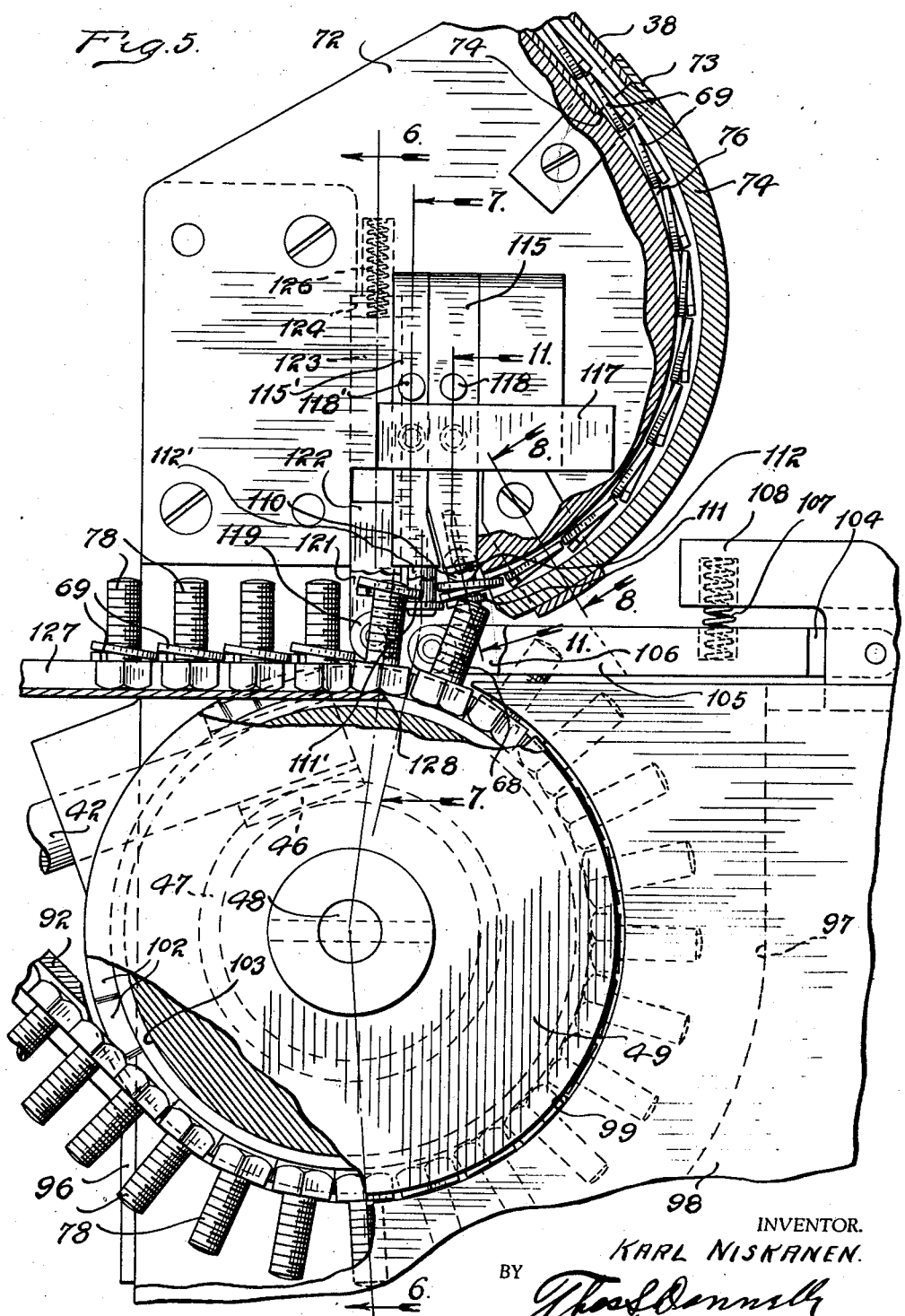

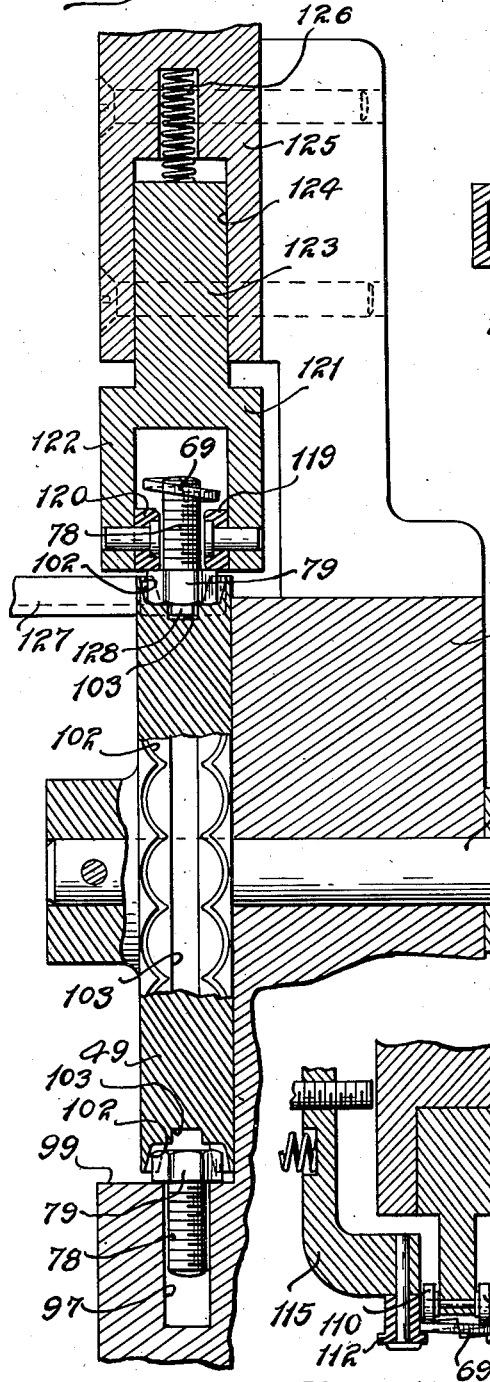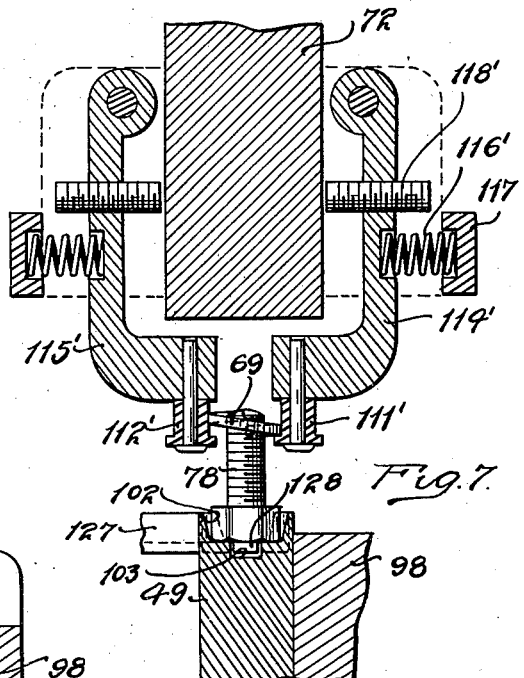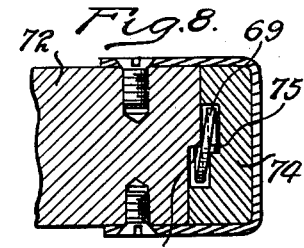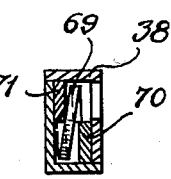

Patented Jan. 27, 1942

2,271,154

UNITED STATES PATENT OFFICE 2,271,154

WASHER AND BOLT ASSEMBLY MACHINE

Karl Niskanen, Fenton, Mich., assignor to Illinois Tool Works, Chicago, Ill., a corporation of Illinois Application December 13, 1937, Serial No. 179,401

7 Claims. (Cl. 29—84)

My invention relates to a new and useful improvement in a bolt and washer coupling mechanism and is particularly adapted for use in coupling together bolts and washers of the spring lock type in which the washer is formed in the nature of a split ring, the ends of which are offset to produce the spring effect.

It is an object of the invention to provide a mechanism whereby the washer may be easily and quickly, mechanically, assembled on the bolt thus relieving of the necessity of hand operations in mounting these two parts together.

It is another object of the invention to provide a mechanism whereby a nut and lock washer of the spring type may be easily and economically assembled together.

Another object of the invention is the provision in a mechanism of this type of a structure whereby a split spring washer may be brought into assembling position in a predetermined location and arrangement.

Another object of the invention is the provision in a mechanism of this type of a conveyor chute for conveying the spring washers to assembling position and the provision of means adjacent the end of the conveyor for receiving and yieldably holding the spring washer in various positions while the bolt is automatically into position for reception of the washer.

Another object of the invention is the provision in a mechanism of this type of a structure for conveying a bolt to a predetermined position for reception of a washer and of means for receiving the bolt from the conveying mechanism after the positioning of the washer thereon.

Another object of the invention is the provision in a mechanism of this type of a novel arrangement for conveying a spring washer along a conveying chute and at the same time clearing obstructions from above the chute.

Another object of the invention is the provision in a mechanism of this type of a conveyor for conveying articles along a chute so arranged and constructed that it may be bent out of operative position upon encountering an immovable obstacle.

Another object of the invention is the provision of a mechanism of this type which will be simple in structure, economical of manufacture, durable, compact, and highly efficient in use and possessed of a maximum speed of assembly of bolts and washers together.

Other objects will appear hereinafter.

The invention consists in the combination and arrangement of parts hereinafter described and claimed.

The invention will be best understood by a reference to the accompanying drawings which form a part of this specification, and in which, Fig. 1 is a side, elevational view of the invention.

Fig. 2 is a top plan view of the invention with parts broken away.

Fig. 3 is an enlarged sectional view taken on line 3—3 of Fig. 1.

Fig. 4 is an enlarged sectional view taken on line 4—4 of Fig. 3, with parts broken away and removed.

Fig. 5 is an enlarged fragmentary, side elevational view of the forward part of the invention with parts broken away and parts shown in section.

Fig. 6 is a fragmentary, sectional view taken on line 6—6 of Fig. 5.

Fig. 7 is a fragmentary, sectional view taken on line 7—7 of Fig. 5.

Fig. 8 is a fragmentary, sectional view taken on line 8—8 of Fig. 5.

Fig. 9 is a sectional view taken on line 9—9 of Fig. 1.

Fig. 10 is a sectional view taken on line 10—10 of Fig. 1.

As shown in Fig. 1, I provide a base 19 projecting upwardly from which, at an incline thereto, are bosses 20 and 21. Secured at one end in the boss 20 and projecting upwardly therefrom is a supporting standard 22. Secured at one end in the boss 21 and projecting upwardly therefrom is a supporting standard 23. Secured to and projecting inwardly from each of the standards 22 and 23, are plates 26 and 27 which engage beneath the side wall of a lower trough 24 and an upper trough 25 and are secured thereto for supporting the same. Extending longitudinally beneath each of these troughs 24 and 25, are supporting plates 28 and 29 which are bolted or otherwise suitably secured to the base rib 30 and 31 of these troughs, respectively.

Secured in the base rib 30 of the upper trough 25 is a longitudinally extending groove 32 which opens at its upper end into the base of the V-space 33 formed by the side walls 34 and 35 of this trough. Formed in the side wall 35 at the lower end thereof is a slot 36. A similar slot 37 positioned above the slot 36 is formed in the side wall 35 but as shown in Fig. 4, this slot 37 is of less length than the slot 36. Secured to the base rib 30 is a delivery tube 38 which opens at its end in communication with the slot 32.

Journalled on the boss 39 which projects upwardly from the base 19 is a shaft 40 carrying a worm gear 41 meshing with a worm on the shaft 42 on which is fixedly mounted the pulley 43. The shaft 42 is journalled in the bearing 44 mounted on the plate 45 which extends upwardly from one end of the base 19. Mounted on this shaft 42 is a worm gear 46 meshing with the worm wheel 47 fixedly mounted on the shaft 48 on which is also fixedly mounted the conveyor disk 49. Fixedly mounted on the shaft 40 is a bevel gear 50 which meshes with a bevel gear 51 fixedly mounted on the shaft 52 which extends through the sleeve 53 projecting inwardly from the side wall 34 of the trough. This shaft 52 also extends through the bearing 54 mounted on the plate 26 and a collar 55 is fixedly mounted on the shaft 52. Fixedly mounted on the shaft 52 is a hub 56 radiating outwardly from which are the spaced resilient blades 57 which serve as sweepers.

The shaft 40 projects through the bearings 58 and 59 projecting outwardly from the sides of the plates 28 and 29, respectively. Fixedly mounted on the shaft 40 is a hub 60 which carries the sprocket wheel 61 engaging the endless chain 62. This chain 62 also passes around the sprocket wheel 63 mounted on the shaft 64 projecting upwardly from the bearing 65 which projects outwardly from the rear end of the plate 28. The construction is such that when the shaft 42 is rotated, the shaft 40 will also rotate and serve to drive the shaft 52 so as to rotate the sweeper wheel carrying the sweeper blades 57. At the same time, the sprocket wheel 63 will be rotated for effecting a traveling of the endless belt or chain 62.

Secured at one end and projecting outwardly from the links of the chain 62, in spaced relation, are the resilient sweeper arms 66 which are adapted, traveling in one direction, to project through the slot 37 and ride above the slot 32. Secured at one of their ends and projecting outwardly from the links of the chain or belt 62 are the pusher arms 67 which are formed from resilient material and which are adapted to ride in the slot 36 and override the slot 32 so as to cause to slide along the slot 32, the lock washers 69 which engage in the slot 32. In operation, the lock washers would be deposited in the upper trough 25 and the sweeper arms 66 would serve as agitators to agitate the washers so that they will arrange themselves in the slot 32 while at the same time these sweeper arms 66 would dislodge any of the washers which had unduly assembled together. The pusher arms 67 serve to push the lock washers which have arranged themselves in the slot 32 forwardly of the base rib 30 and outwardly from the slot 32 into the tube 38.

As shown clearly in Fig. 1 and in Fig. 2, this tube 38 twists in extending downwardly at an incline from the forward end of the trough 25.

As shown in Fig. 9, the tube 38 is of a width slightly greater than the diameter of the washer 69. Positioned in the tube 38 are plates 70 and 71 along the face of which is adapted to ride the end faces of the split washer 69. This tube extends downwardly to a plate 72 and extends partially along the periphery of this plate and is secured thereto by the clips 73 in engagement with a shoulder 74 at a cut-away portion, the plate 72 having a channel formed therein to constitute a continuance of the tube 38 in conjunction with a cover plate 74 secured thereto. As shown in Fig. 8 the necessary shoulders 75 and 76 against which the ends of the washer may engage are formed in the plate 72 and the cover plate 74.

When the chain 62 is being driven, the hub 56 will also rotate to carry the sweeper blades in a clockwise direction, the washers traveling upwardly from the lower rear end into the upper front end. These blades 57 are formed from resilient material and will serve to sweep the lock washers which may be carried forwardly above the groove 42. Consequently, the washers may be conveyed from the rear of the upper trough 25 through the tube 38 and twisted as to their position so that in discharging from the end of the groove these spring washers are in a horizontal position, that is with the axis directed vertically. It will also be noted that these washers cannot rotate on their own axis and this is important in the proper feed of the washers onto the bolts.

Formed in the upper face of the base rib 31 of the lower trough 24 is a longitudinally extended groove 77 in which may engage the stem of the bolts 78 which may be deposited in the trough 24, the heads 79 of these bolts being larger than the groove 77. Formed through the side wall 80 of the lower trough 24 is an elongated slot 81 through which is adapted to extend the spring pusher arms 82 when the same are traveling in one direction. These pusher arms are mounted at one end and extended outwardly from the links of a chain 83 which pass around a sprocket wheel 84 fixedly mounted on and rotatable in unison with the shaft 40. A bearing 85 is provided with a rear end of the lower trough 24 for accommodating a shaft and sprocket wheel similar to the shaft 64 and the sprocket wheel 63 already described and illustrated in Fig. 4. These pusher arms are of a resilient type so that they may be flexed out of their normal position in case they meet an unmovable obstruction while the chain is traveling. The arms 82 serve to push the bolts which have arranged themselves with their stems 78 in the groove 77 forwardly of the trough 24. Journalled in the bearing 85 extending inwardly from the wall 86 of the lower trough is a shaft 89 on which is fixedly mounted a hub 88 radiating outwardly from which are the spring blades 89 which serve as sweeper blades for sweeping rearwardly the bolts which may be lying above the groove 77 and carried forwardly. These blades are sufficiently flexible so that they may be flexed out of normal position in the event of meeting an unmovable obstruction. The shaft 87 is driven by a bevel gear 90 fixedly mounted thereon and meshing with the bevel gear 91 fixedly mounted on the shaft 40.

Connected to the forward end of the base rib 31 and communicating with the groove 77 so that the groove 77 terminates at its end, is a delivery tube 92 which is provided on its base with a slot 93 through which the stems 78 of the bolts may project, the inwardly projecting flanges 94 and 95 serving to retain the head in the tube 92. The lower end of the tube 92 is angularly turned and split to provide the bifurcations 96 which straddle the opening of a groove 97 formed in a plate 98 which is mounted on the plate 45. This plate 98 is provided with a circular recess 99 in which is adapted to rotate the feeding disk 49 mounted on the shaft 48 and driven by the worm wheel 47 meshing with the worm 101 fixedly mounted on the shaft 42.

Formed in the periphery of the feeding disk 49 is a plurality of substantially circular pockets 102 which break into each other. Extending circumferentially of the disk 49 centrally thereof and at the base of the pockets 102 is a groove 103.

As the bolts pass downwardly in the chute 92, the feeding disk 49 rotates so as to envelope the head of each bolt with one of the pockets 102 and carry the bolt around the groove 97.

Swingably mounted on the plate 98 is the tree of a yoke, the arms 105 and 106 of which are normally pressed downwardly by the spring 108 engaging the overhanging bracket 108 formed as a part of the plate 98. On the ends of each of the arms 105 and 106 is mounted a roller 209 between which the bolt stems 78 are carried by the feeding disk 49. As the spring washers leave the end of the channel formed by the cover 74 and the plate 72, these washers pass beneath and ride in contact with rollers 109 and 110 which are mounted on a bracket depending from the plate 72 as shown in Fig. 11. Simultaneously, the washers pass between the rollers 111 and 112 rotatably mounted on the bracket arms 114 and 115 by the pins 113. Each of these bracket arms is mounted in the manner illustrated in Fig. 7, the feeding screws 118 limiting their swinging movement in one direction and the springs 116 engaging the plate 117 resisting their swinging movement in the opposite direction so that the rollers are pressed into approach relatively to each other to similarly grasp the washers 69. When the washers reach the rollers 111 and 112 and the feeding disk 49 is rotating, the feeding disk will carry a bolt stem 78 into position to contact the downwardly offset portion of the spring washer, thus aligning the washer with the bolt. As the bolt moves it will carry this washer 69 with it. As the bolt stem 78 moves counter-clockwise, in the view shown in Fig. 5, and carries with it this spring washer, the washer will move between an additional pair of rollers 111' and 112' illustrated in Fig. 7 and carried by the rockable arms 114' and 115'. Each of these arms is provided with an adjusting screw 118' threaded therethrough and adapted to engage the plate 72 and limit swingable movement of these arms 114' and 115' in response to the pressures of the spring 116'. These springs 116' abut at one end against the brackets 117 carried by the plate 72 and at their opposite ends against the arms 114' and 115'. From between these rollers 111' and 112' the washer will be carried further counter-clockwise to the position where the bolt stem will engage between the rollers 119 and 120 at which time the bolt stem 78 will be in vertical position permitting the washer to fall downwardly thereon.

These rollers 119 and 120 are carried by the yoke arms 121 and 122 shown in Fig. 6. The stem 123 of this yoke slideably engages in the socket 124 formed in the bar 125 which is attached to the plate 72. A spring 126 serves to resist upward movement of the rollers 119 and 120, these rollers engaging the upper face of the head 76 of the bolt and retaining it in upright steady position.

Positioned adjacent the forward disk 48 is a channel-shaped track 127 which terminates in a tongue 128 which engages in the central, circumferentially extending groove 103 so that as the feeding disk 49 continues turning counter-clockwise, the bolts will ride out of the pockets 102 onto the track 127, each succeeding bolt forcing the preceding bolt to travel along the track so that there is a continual travel of these bolts along this track with the spring washer assembled thereon.

It will be noted and particularly from an examination of Fig. 4, that the chain 62 rides in contact with the outer face of the base rib 30. Likewise, the chain 83 rides in contact with the outer face of the base rib 31 so that the chain in its travel is prevented from slapping or buckling, thus assuring a constant fixed movement.

With a machine of this kind, it is obvious that the washers and bolts may be deposited in the separate troughs and the assembling of the washer on the bolt completed by a mechanical operation of the machine. Thus, there is provided a means for cheaply, economically and quickly assembling the washers on the bolts so as to relieve all necessity of the usual labor involved in such an operation.

While I have illustrated and described the preferred form of construction, I do not wish to limit myself to the precise detail of structure shown but desire to avail myself of such variations and modifications as may come within the scope of the appended claims.

What I claim as new is:

1. An assembling machine including, a rotatable disk having a plurality of pockets in its periphery, each of said pockets being adapted for the reception of a bolt head fed to the underside thereof, said disc, upon rotation, being adapted for conveying said bolts individually from said under-side position and carrying the same around into upright position; means for maintaining the bolt heads in said pockets as they are conveyed; means for presenting washers, individually, to the bolts as they reach their upright position; a conveying track adapted for lifting said bolts, individually, out of the pockets on said disk after they have received their washers, each succeeding bolt forcing the preceding bolt along said lifting means as a conveying track, said disk having a centrally located peripheral groove formed thereon at the bottom of said pockets; and a tongue on the bottom of said track for engaging in said peripheral groove for sliding under the bolt heads carried by said disk.

2. An assembling machine including, a slide way for washers; rollers engageable with one face of said washers upon emergence of the same from the discharge end of said slide way; a pair of spaced rollers, adjacent said first mentioned rollers, movably mounted relatively to each other for engaging said washers at diametrically opposite sides and for bearing against the opposite face of said washer; resilient means for normally urging said spaced rollers toward said first named rollers and retaining gripping engagement with the washer positioned therebetween and means for conveying bolts to said washers as they are held by said rollers for assembling the washers with the bolts.

3. An assembling machine including, a slide way for washers; rollers engageable with one face of said washers upon emergence of the same from the discharge end of said slide way; a pair of spaced rollers, adjacent said first mentioned rollers movably mounted relatively to each other for engaging said washers at diametrically opposite sides and for bearing against the opposite face of said washer; resilient means for normally urging said spaced rollers toward said first mentioned rollers for retaining gripping engagement with the washer positioned therebetween; and rotatable means for carrying a bolt stem into engagement with said washers for removing the same from between said gripping rollers, said bolt stems engaging an offset end on each of said washers.

4. An assembling machine including, a slide way for washers; rollers engageable with one face of said washers upon emergence of the same from the discharge end of said slide way; a pair of spaced rollers, adjacent said first mentioned rollers, movably mounted relatively to each other for engaging said washers at diametrically opposite sides upon discharge and for bearing against the opposite face of said washer; resilient means for normally urging said spaced rollers toward said first mentioned rollers and retaining gripping engagement with the washer positioned therebetween; rotatable means for carrying a bolt stem into engagement with said washers for removing the same from between said gripping rollers, said bolt stems engaging an offset end on each of said washers; and a pair of spaced rollers for engaging said bolt stems, upon travel of the same to vertical position for retaining the same in position during the travel of the washer in response to gravity onto said bolt stems.

5. In a machine of the class described, a delivery tube adapted for the reception of split spring washers; means in said tube for preventing rotation of said washers during travel therethrough and presenting said washers, as they are discharged therefrom, in a predetermined position with their offset portion projecting downwardly; means for releasably gripping said washers upon discharge from said tube; a rotatable disk having a plurality of spaced pockets in its periphery adapted for the reception of a bolt head with its stem projecting radially outwardly, said disk, upon being rotated, carrying a bolt stem into engagement with the downwardly projecting offset portion of a split washer, said bolt stem effecting, upon travel, a release of said washer from said gripping means; and additional gripping means adapted for engaging said washer upon release of the same from said first-named gripping means, said bolt stem effecting a release of said washer from said second gripping means, upon further travel of said disk, said bolt stem, upon release of said washer from said second gripping means, being in substantially vertical position.

6. In a machine of the class described, a delivery tube adapted for the reception of split spring washers; means in said tube for preventing rotation of said washers during travel therethrough and presenting said washers, as they are discharged therefrom, in a predetermined position with their offset portion projecting downwardly; means for releasably gripping said washers upon discharge from said tube; a rotatable disk having a plurality of spaced pockets in its periphery adapted for the reception of a bolt head with its stem projecting radially outwardly, said disk, upon being rotated, carrying a bolt stem into engagement with the downwardly projecting offset portion of a split washer, said bolt stem effecting, upon travel, a release of said washer from said gripping means; additional gripping means adapted for engaging said washer upon release of the same from said first-named gripping means, said bolt stem effecting a release of said washer from said second gripping means, upon further travel of said disk, said bolt stem, upon release of said washer from said second gripping means, being in substantially vertical position; and means engageable with the inner face of said bolt head for pressing the same firmly into position in said pocket upon movement of said bolt stem to vertical position, said washer moving by gravity onto said stem.

7. In a machine of the class described, a delivery tube adapted for the reception of split spring washers; means in said tube for preventing rotation of said washers during travel therethrough and presenting said washers, as they are discharged therefrom in a predetermined position retained with their offset portion projecting downwardly; means for releasably gripping said washers upon discharge from said tube; a rotatable disk having a plurality of spaced pockets in its periphery adapted for the reception of a bolt head with its stem projecting radially outwardly, said disk, upon being rotated, carrying a bolt stem into engagement with the downwardly projecting offset portion of a split washer, said bolt stem effecting, upon travel, a release of said washer from said gripping means; additional gripping means adapted for engaging said washer upon release of the same from said first-named gripping means, said bolt stem effecting a release of said washer from said second gripping means upon further travel of said disk, said bolt stem, upon release of said washer from said second gripping means, being in substantially vertical position; means engageable with the inner face of said bolt head for pressing the same firmly into position in said pocket upon movement of said bolt stem to vertical position, said washer moving by gravity onto said stem, said disk having a peripheral groove formed centrally therein and lying below the bottom of and communicating with said pockets; and means engaging in said groove for engaging a bolt head after passage of said washer thereon for removing the same from the pocket in which engaged, each successive bolt causing each preceding bolt to travel along said engaging means.

KARL NISKANEN